United States Patent
Doughty et al.

[19]

[11] Patent Number: 6,126,396
[45] Date of Patent: Oct. 3, 2000

[54] AFT FLOWING SERPENTINE AIRFOIL COOLING CIRCUIT WITH SIDE WALL IMPINGEMENT COOLING CHAMBERS

[75] Inventors: Roger L. Doughty, Cincinnati; Richard W. Jendrix, Wyoming, both of Ohio

[73] Assignee: General Electric Company, Cincinnati, Ohio

[21] Appl. No.: 09/208,039

[22] Filed: Dec. 9, 1998

[51] Int. Cl.[7] .................................................. B63H 1/14
[52] U.S. Cl. .......................................................... 416/97 R
[58] Field of Search ........................ 416/96 R, 96 A, 416/97 R, 97 A, 92; 415/115, 116

[56] References Cited

U.S. PATENT DOCUMENTS

| | | |
|---|---|---|
| 4,616,976 | 10/1986 | Lings et al. . |
| 4,770,608 | 9/1988 | Anderson et al. . |
| 5,271,715 | 12/1993 | Zelesky et al. . |
| 5,387,085 | 2/1995 | Thomas, Jr. et al. . |
| 5,387,086 | 2/1995 | Frey et al. . |
| 5,498,133 | 3/1996 | Lee . |
| 5,516,260 | 5/1996 | Damlis et al. . |
| 5,533,864 | 7/1996 | Nomoto et al. . |
| 5,591,007 | 1/1997 | Lee et al. . |
| 5,660,524 | 8/1997 | Lee et al. . |
| 5,669,759 | 9/1997 | Beabout . |
| 5,702,232 | 12/1997 | Moore . |
| 5,813,836 | 9/1998 | Starkweather . |
| 5,820,337 | 10/1998 | Jackson et al. . |
| 5,997,251 | 12/1999 | Lee .................................. 416/97 R |

FOREIGN PATENT DOCUMENTS 60-135606  7/1985  Japan .

*Primary Examiner*—Edward K. Look
*Assistant Examiner*—James M. McAleenan
*Attorney, Agent, or Firm*—Andrew C. Hess; Rodney M. Young

[57] ABSTRACT

A gas turbine engine hollow airfoil includes an airfoil outer wall having width wise spaced aparted pressure and suction side walls joined together at chordally spaced apart leading and trailing edges of the airfoil and extending longitudinally from a root to a tip. At least one internal aft flowing serpentine cooling circuit inside the airfoil has an exit that is positioned aft of the entrance so as to have a chordal flow direction afterwards from the leading edge to the trailing edge within the serpentine circuit. At least one longitudinally extending first side wall impingement chamber is in downstream fluid communication with the serpentine cooling circuit within the airfoil and positioned between one of the side walls, preferably the pressure side wall, and a first inner wall bounding the serpentine cooling circuit. Impingement cooling apertures are disposed in the first inner wall between one of the serpentine channels and the side wall impingement chamber. A first plurality of side wall film cooling holes may extend out from the first side wall impingement chamber through the pressure side wall. At least one tip cooling hole extending out of at least one of the impingement chambers may be disposed through a longitudinally outer tip wall of the tip of the airfoil.

20 Claims, 5 Drawing Sheets

AFT FLOWING SERPENTINE AIRFOIL COOLING CIRCUIT WITH SIDE WALL IMPINGEMENT COOLING CHAMBERS

The Government has rights in this invention pursuant to Contract No. N00019-96-C-0176 awarded by the Department of the Navy.

BACKGROUND OF THE INVENTION

1. Field of the Invention

The present invention relates generally to cooling air circuits of turbine rotor blades and stator vanes in gas turbine engines and, more specifically, to serpentine cooling circuits feeding cooling air to side wall impingement cooling chambers.

2. Discussion of the Background Art

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk. The temperatures within gas turbines may exceed 2500 degrees Fahrenheit, and cooling of turbine blades is very important in terms of blade longevity. Without cooling, turbine blades would rapidly deteriorate. Improved cooling for turbine blades is very desirable, and much effort has been devoted by those skilled in the blade cooling arts to devise improved geometries for the internal cavities within turbine blades, in order to enhance cooling. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Typical turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness and, the cooling air is discharged from the passages through various film cooling holes disposed around the outer surface of the airfoil.

Typical mid-circuit cooling air, after picking up the heat in the serpentine passage, exits through film cooling holes. One or more rows of film cooling holes are placed on the pressure and suction sides. New highly aerodynamically efficient airfoils in low through flow turbine designs are subject to an external gas path flow along the pressure side that has low velocity. This can result in a very high blowing ratio (mass flux ratio of film cooling air to gas flow) through the film cooling holes and very poor film cooling effectiveness (film blow-off) on the pressure side of the airfoil. Geometrical limitations of at least some of the cavities which supply the film cooling air prevent or make difficult the use of film holes on both pressure and suction sides that have relatively shallow angles from the surfaces of the sides. The use of larger angles would result in significant aerodynamic mixing losses and poor film cooling effectiveness because much of the film cooling air would flow out of the boundary layer. Therefore, it is desirable to have a circuit design which can avoid the use of film cooling in such areas of the airfoil and provide effective and efficient film and convective cooling of the entire airfoil.

U.S. Pat. No. 5,660,524, entitled "Airfoil Blade Having A Serpentine Cooling Circuit And Impingement Cooling", discloses an airfoil blade, such as a jet engine turbine rotor blade with an internal serpentine coolant circuit that has a last downstream passageway bounded by four monolithic inner walls which are monolithic with at least a portion of the outer walls. Two of the inner walls are spaced from the outer walls and contain air impingement orifices creating two impingement chambers. Some coolant in the serpentine circuit exits the airfoil blade through a coolant exit in the blade tip. The remaining coolant in the circuit passes through the impingement orifices and exits the blade through film cooling holes in the outer walls.

U.S. Pat. No. 5,813,836, entitled "Turbine Blade", discloses an airfoil section having a double-wall construction for side-wall impingement cooling on the pressure side and a forward flowing multi-pass serpentine cooling air circuit along the suction side of the blade which flows cooling air forward with respect to the aft flowing hot gases through the turbine. The airfoil section also includes a leading edge cavity having a plurality of radial film cooling holes supplied by the three pass serpentine cooling circuit. As cooling air flows along the passageways, it convectively cools the portions of the turbine blade adjacent these passageways. The airfoil section further includes a trailing edge cavity to cool the trailing edge flow region of the airfoil section. A plurality of impingement cavities are located on the pressure side wall and impingement holes provide cooling air from the serpentine passageways of the inner cavity and the impingement cavities. Multi-row, compound angle film holes extend from the impingement cavities so that cooling air from the impingement cavities can be discharged from the airfoil section. This patent also teaches that the leading edge cavity may be supplied mainly by the serpentine passage and supplemented by a cooler airflow from a refresher passageway to form a modified warm bridge cooling circuit for cooling the leading edge.

Known turbine airfoil cooling techniques include the use of internal cavities forming a serpentine cooling circuit. Particularly, serpentine passages, leading edge impingement bridges, film holes, pin fins, and trailing edge holes or pressure side bleed slots are utilized for blade cooling. It would be desirable to provide improved blade cooling. In providing even better blade cooling, it also would be desirable to avoid significantly increasing the blade fabrication costs.

SUMMARY OF THE INVENTION

A gas turbine engine hollow airfoil with an airfoil outer wall having width wise spaced apart pressure and suction side walls joined together at chordally spaced apart leading and trailing edges of the airfoil and extending longitudinally from a root to a tip. Inside the airfoil, at least one internal serpentine cooling circuit has a plurality of longitudinally extending internal ribs between longitudinally extending serpentine channels of the internal serpentine cooling circuit. The serpentine cooling circuit has terminal end that is positioned aft of the entrance so as to have a chordal flow direction afterwards from the leading edge to the trailing edge within the serpentine circuit. At least one longitudinally extending first side wall impingement chamber is in downstream fluid communication with the serpentine cooling circuit within the airfoil and positioned between one of the side walls and a first inner wall bounding the serpentine cooling circuit. The first inner wall preferably has impingement cooling apertures between one of the serpentine channels and the side wall impingement chamber. The one side wall may be the pressure side wall and a first plurality of side wall film cooling holes may extend out from the first side wall impingement chamber through the pressure side wall. The airfoil preferably includes a longitudinally extending second side wall impingement chamber in downstream fluid communication with the serpentine cooling circuit and positioned between the one of the side walls and a second inner wall bounding the serpentine cooling circuit. The first and second inner walls may be integral and contiguous. Preferably, the first impingement cooling apertures are between a first one of the serpentine channels and the first side wall impingement chamber and the second impingement cooling apertures are the second inner wall between a second one of the serpentine channels and the second side wall impingement chamber. The airfoil preferably includes a first plurality of side wall film cooling holes leading from at least one of the first and second side wall impingement chambers through the pressure side wall.

In one particular embodiment, leading edge and trailing edge cooling plenums are disposed with the airfoil along the leading and trailing edges and have cooling air discharge apertures in the outer wall along the leading edge and trailing edges, respectively. The leading edge cooling plenum has leading edge feed apertures through a leading edge span rib of a forward feed channel located forward of the internal serpentine cooling circuit and a plurality of leading edge cooling apertures extend out of the leading edge cooling plenum through the outer wall around the leading edge. The trailing edge cooling plenum has trailing edge feed apertures through a trailing edge span rib of an channel located aft of the internal serpentine cooling circuit and a plurality of trailing edge cooling apertures extend out of the trailing edge cooling plenum through the outer wall at the trailing edge. The leading edge cooling apertures are preferably shower head film cooling holes and the trailing edge cooling apertures are preferably trailing edge cooling slots. At least one tip cooling hole extending out of at least one of the impingement chambers may be disposed through a longitudinally outer tip wall of the tip of the airfoil.

ADVANTAGES OF THE INVENTION

The present invention provides advantages that include a significant improvement in the cooling of a mid-chord portion of the pressure side walls of the outer wall of a hollow gas turbine airfoil using less cooling air than would otherwise be necessary while still providing sufficient cooling for the airfoil tip and acceptable airfoil tip metal temperatures. The cooling air in the mid-circuit is isolated from the pressure side wall heat load, thus, allowing cooler temperatures at the tip of the last up-pass and better tip cooling. The downstreamwise serpentine circuit design of the present invention provides the coldest cooling air in the hottest areas of the blade. The cooling air temperatures are colder than the cooling air temperatures in the same channels and chambers in conventional upstreamwise serpentine circuit designs. The downstreamwise serpentine circuit will have a colder average spanwise rib wall temperature than that of an upstreamwise serpentine circuit and, therefore, have an overall better cooling air temperature distribution in the chordwise direction and a better bulk temperature of the airfoil for better cooling of the entire airfoil.

The impingement chambers offers additional cooling capabilities that are more efficient and, therefore, less total cooling air is required and less film cooling is required. Furthermore, the downstreamwise serpentine circuit design also provides an internal cooling air pressure which is more consistent with and tailored to the external gas pressure as the external gas expands in the chordwise or downstream direction through the turbine. This also carries through to the impingement chambers from which the film cooling holes extend out from. This results in a better back flow margin for the blade and a more optimum use of internal cooling potential by trading more pressure consumption for better heat transfer.

Outer wall portions closer to the leading edge are cooled by colder fresher cooling air than in those in the prior art reducing or eliminating the amount of film cooling required in this region. This will result in better turbine performance and lower cost in manufacturing. In addition, the film cooling holes closer to the trailing edge can have shallower flow angles from surface than those closer to the leading edge resulting in a better film cooling effectiveness. The external gas flow velocity closer to the trailing edge accelerates to a higher speed than at portions along the airfoil side walls closer to the leading edge. Therefore, the airfoil cooling can be better tailored for conductive and convective cooling of portions of the sides of the outer wall closer to the leading edge and film cooling holes may be used for portions of the sides closer to the trailing edge where they will have smaller and, therefore, better blowing ratios and result in a better film cooling effectiveness and overall cooling efficiency.

Other advantages include increased coolant side heat transfer coefficient and improved metering capability for external film flow. The improved cooling also provides for cooler air to be discharged through the tip cooling holes providing improved cooling for the squealer tip.

Generally, design requirements for airfoils at the lower spans are driven by concerns for rupture at high stress levels at reduced metal temperature and at the upper regions by concerns over elevated surface temperature to avoid oxidation and fatigue crack initiation. The downstream flowing serpentine with side wall impingement chambers design of the present invention addresses these needs along with the ability to better optimize internal airfoil cooling flow and blade life.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
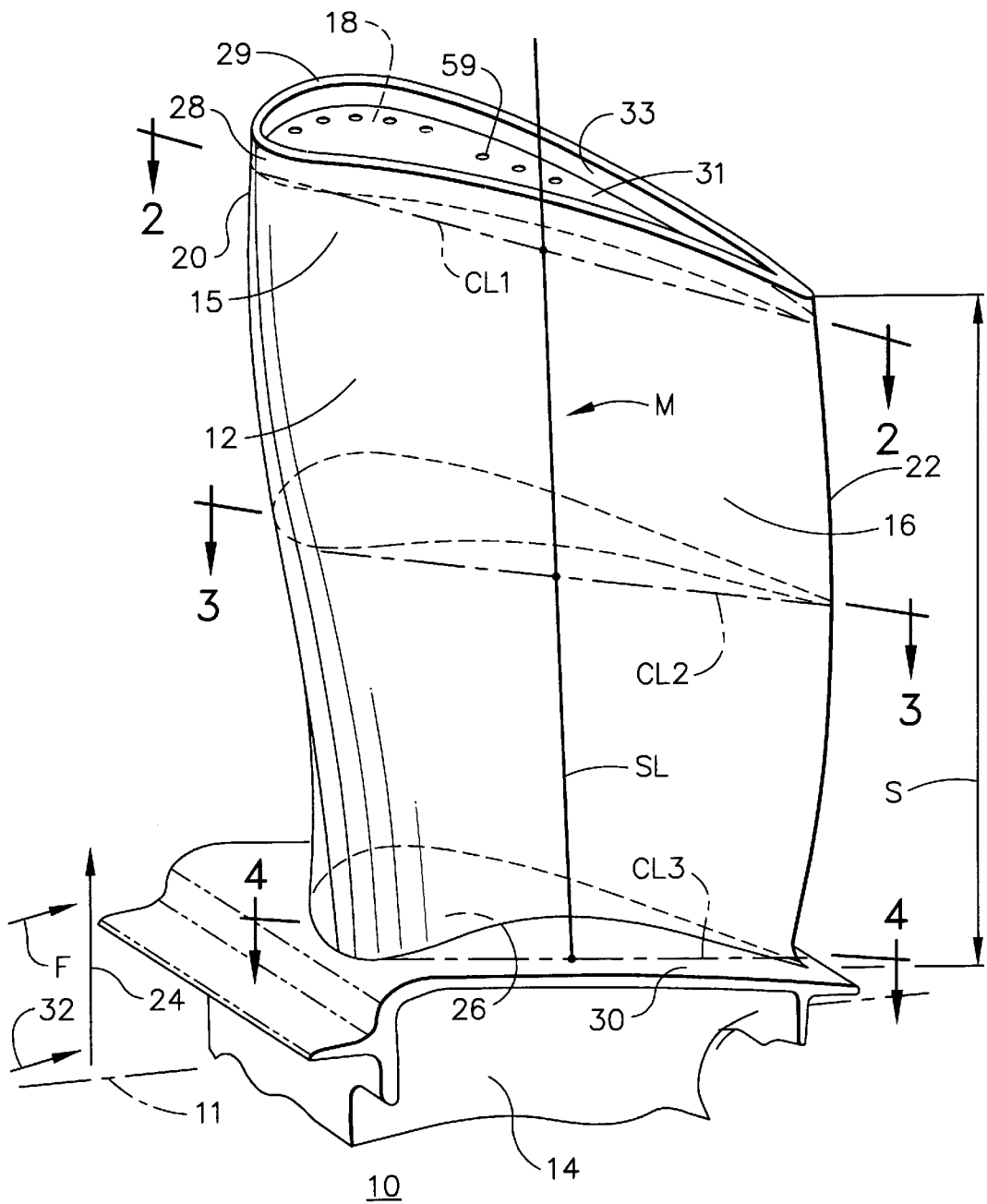
FIG. 1 is a perspective view of a gas turbine engine turbine rotor blade which incorporates the airfoil of the invention.

Illustrated in FIG. 1 is an exemplary turbine blade 10 for a gas turbine engine designed to be operated in a hot gas stream that flows in an axial flow downstream direction F. The blade 10 includes a hollow airfoil 12 and a conventional root 14 used to secure the blade 10 to a rotor disk (not shown) of the engine which is circumscribed about an engine centerline 11. As further illustrated in cross-sections of the airfoil 12 in FIGS. 2–5, the airfoil 12 includes an outer wall 15 with a pressure side wall 16 and a suction side wall 18 joined together along an upstream leading edge 20 and a downstream trailing edge 22 which is spaced chordally apart from the leading edge. The airfoil 12 extends longitudinally in a radial direction 24 away from the engine centerline 11 in a spanwise direction of the airfoil 12 from a radially inner base 26 to a radially outer airfoil tip 28 along a span S of the airfoil. The airfoil tip 28 is illustrated as a squealer tip having an outward extension from the outer wall 15 or a squealer wall 29 extending longitudinally outward from and peripherally around an outer tip wall 31 forming a squealer tip cavity 33 therein. Tip cooling holes 59 extending through the outer tip wall 31 from within the hollow airfoil 12 to the squealer tip cavity 33 are used to cool the tip cavity. The inner base 26 is defined at a conventional platform 30 which forms the inner flow boundary of the blade 10 and below which extends the root 14.

Figure 2:
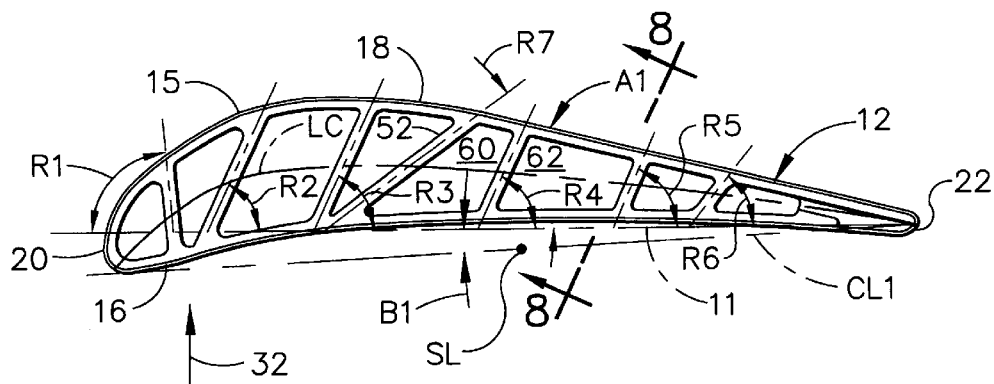
FIG. 2 is a sectional schematic illustration of an airfoil tip cross-section through line 2—2 of the airfoil in FIG. 1.
Figure 3:
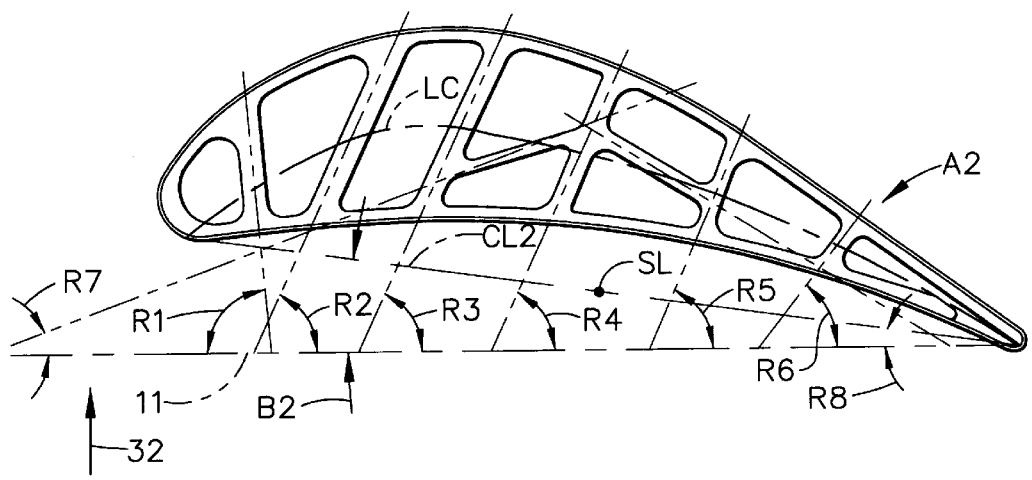
FIG. 3 is a sectional schematic illustration of an airfoil mid-span cross-section through line 3—3 of the airfoil in FIG. 1.
Figure 4:
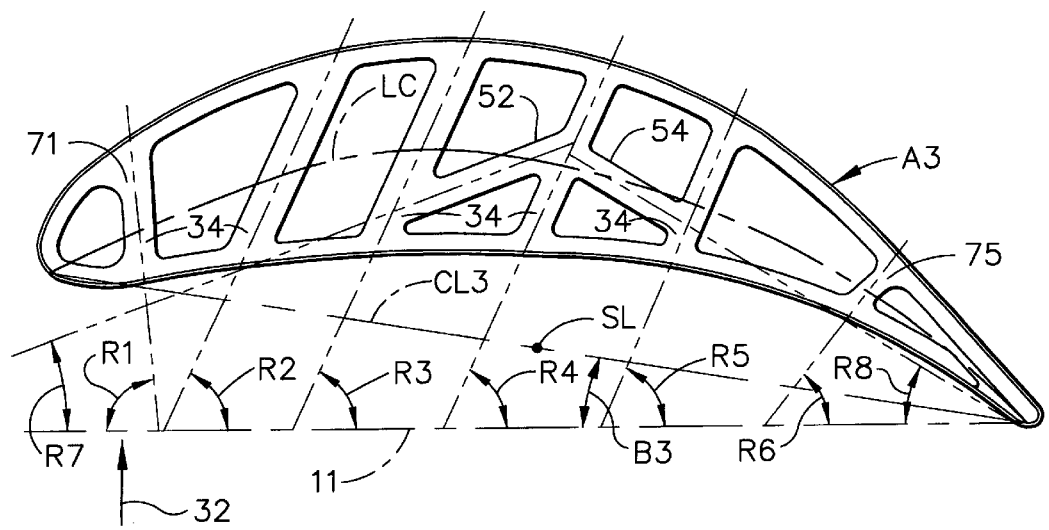
FIG. 4 is a sectional schematic illustration of an airfoil hub cross-section through line 4—4 of the airfoil in FIG. 1.

The airfoil 12 may have a high degree of twist about a stacking line SL as indicated by the variation of angle of first second and third chord lines CL1, CL2, and CL3, respectively, with respect to the engine centerline 11. FIGS. 2–4 illustrate first, second, and third airfoil cross-sections A1, A2, and A3 are taken at tip, mid-span, and platform locations, correspondingly through lines 2—2, 3—3, and 4—4 in FIG. 1. The airfoil 12 may also have a twist whereby a chord angle varies from a first chord angle B1 at the tip 28 through a third chord angle B3 at the platform 30. The first, second, and third chord angles B1–B3 are defined as the corresponding angle between the first, second, or third, chord line CL1–CL3, respectively, that extend from the leading edge 20 to the trailing edge 22, with respect to the engine centerline 11. The different airfoil sections of a twisted airfoil are typically angled about a stacking line SL. The stacking line SL may be curved circumferentially as well as axially as may the leading and trailing edges 20 and 22, respectively. Modern day turbine airfoil also typically have a high degree of camber as illustrated by camber lines LC.

During operation of the blade 10, combustion gases 32 are generated by a combustor (not shown) and flow downstream over both airfoil pressure and suction side walls 16 and 18, respectively, of the outer wall 15. The radial or longitudinal temperature profile of the combustion gases 32 typically is center-peaked near a mid-span region above a mid-span chord, such as the second chord line CL2, of the airfoil from about 50% to about 80% thereof. Secondary flow fields between adjacent ones of the airfoils 12 may cause the temperature profile to shift radially outwardly over the airfoil pressure side wall 16 radially outwardly over a range of about 70% to about 85% of the radial height or span S of the airfoil 12. Accordingly, the pressure side wall 16 experiences its greatest heat input or load above the mid-span region in the 70% to 85% span height.

In accordance with the present invention, preferential chordwise and radial or spanwise cooling of the airfoil 12 is effected to better match the distribution of the heat load thereto from the combustion gases 32. Although an exemplary gas turbine rotor blade 10 is illustrated in FIGS. 1–8, the invention applies equally as well to turbine stator vanes having similar airfoils which may be similarly cooled in accordance with the present invention.

Figure 5:
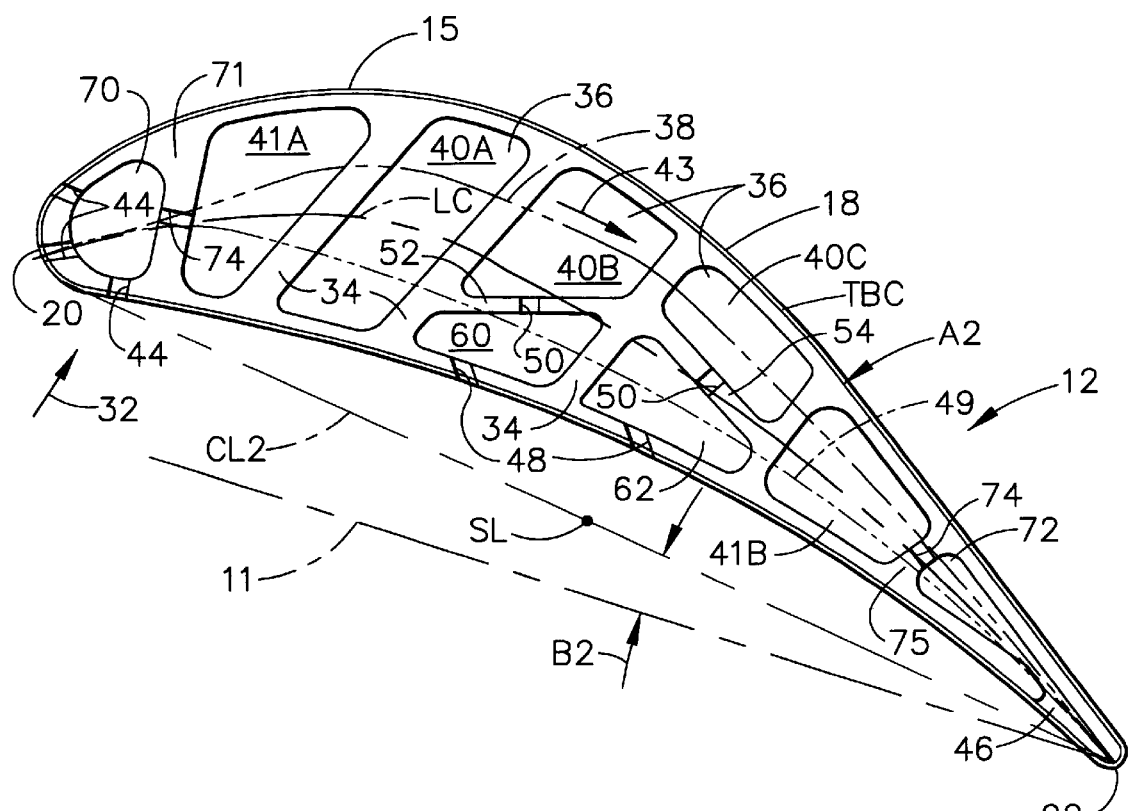
FIG. 5 is an enlarged view of the sectional schematic illustration of the airfoil in FIG. 4.
Figure 8:
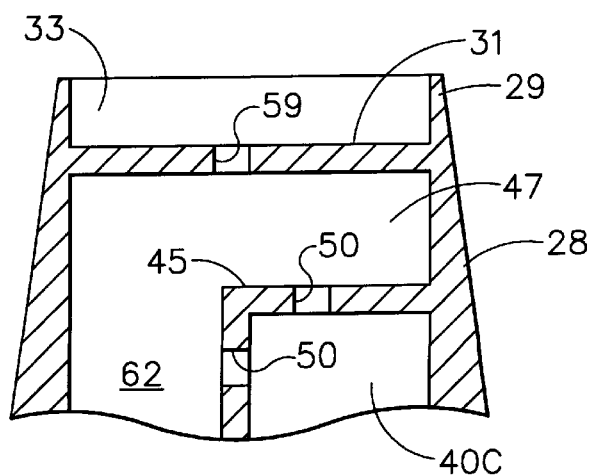
FIG. 8 is a sectional schematic illustration through line 8—8 in FIG. 5 of a tip portion of the airfoil.
Figure 6:
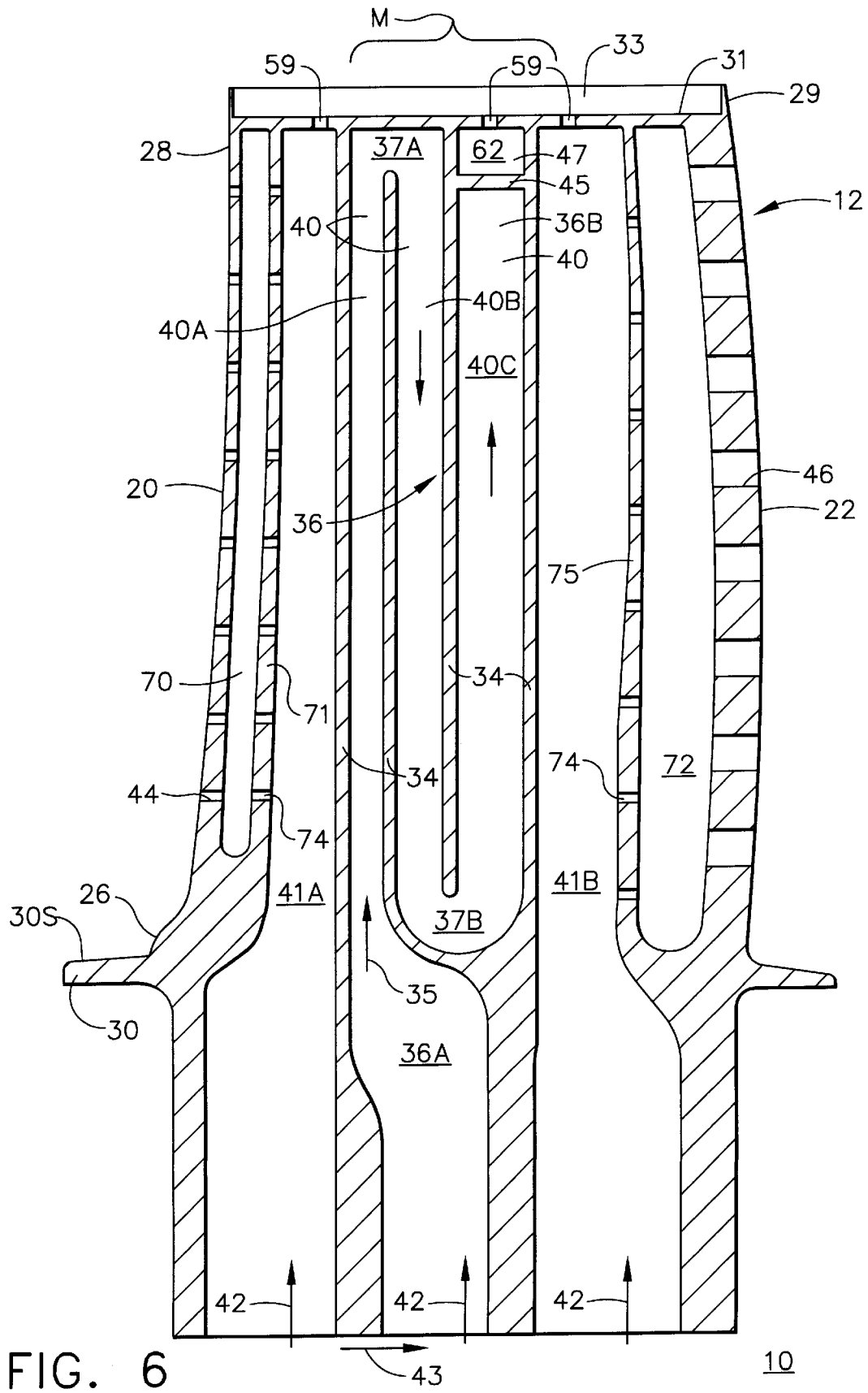
FIG. 6 is a sectional illustration of an exemplary gas turbine engine airfoil laid out flat along a mid-line through a downstream flowing serpentine cooling circuit therein.

More specifically, the pressure and suction side walls 16 and 18, respectively, are spaced circumferentially or laterally apart from each other between the leading and trailing edges 20, 22 and are integrally joined together by a plurality of internal transverse ribs indicated generally at 34 which extend between the pressure and suction side walls 16 and 18, respectively. At least some of the transverse ribs 34 define at least one cooling serpentine cooling circuit 36 as illustrated in FIGS. 5 and 6. The airfoil cross-section in FIG. 5 is an enlarged view of the same section in FIG. 4 and FIG. 6 illustrates the airfoil 12 laid out flat along a cooling circuit split-line 38 that passes through the downstream or aft flowing serpentine cooling circuit 36. The serpentine cooling circuit 36 is constructed so as to cause a serpentine cooling flow 35 within the cooling circuit 36 to flow in a chordal flow direction 43 afterwards from the leading edge 20 to the trailing edge 22 within the cooling circuit 36. The cooling circuit 36 includes an entrance 36A positioned forward of a terminal end 36B to cause the serpentine cooling flow 35 to flow in the chordal flow direction 43 afterwards from the leading edge 20 to the trailing edge 22 to better match the applied heat loads from the combustion gases 32 and to even more effectively tailor the serpentine cooling flows 35 to the heat loading on and more effectively cool the airfoil 12.

The serpentine cooling circuit 36 includes longitudinally extending serpentine channels 40 separated by the chordally spaced apart internal ribs 34 as illustrated in FIG. 6. FIG. 6. illustrates a three pass serpentine cooling circuit 36 having three longitudinally extending serpentine channels 40 bounded by four chordally spaced apart internal ribs 34, however more serpentine channels or passes may be used.

In the exemplary embodiment illustrated in FIG. 6, the serpentine cooling circuit 36 is disposed near the mid-chord region M (also shown generally in FIG. 1) of the airfoil 12 between the leading edge 20 and the trailing edge 22 since experience has shown that the highest heat input in the airfoil 12 is in the mid-chord region near the airfoil tip 28 and on the pressure side wall 16 for example. As indicated above in the Background section, the center-peaked temperature profile for the combustion gases 32 along with any radial migration will effect a maximum temperature on the pressure side wall 16 of the airfoil 12 in the range of about 70% to about 85% of the span height.

The serpentine cooling circuit 36 further includes one of the serpentine channels 40 which serves as an inlet channel 40A extending radially upwardly to a radially outer first turning channel 37A. The next channel is an intermediate channel 40B which directs cooling air radially inward to a radially inner second turning channel 37B which in turn feeds a third serpentine channel which serves as an end outlet channel 40C extending radially upwardly to and terminates at a transverse sideways rib 45 radially inward of the outer tip wall 31 forming a transverse passage 47 therebetween.

Figure 7:
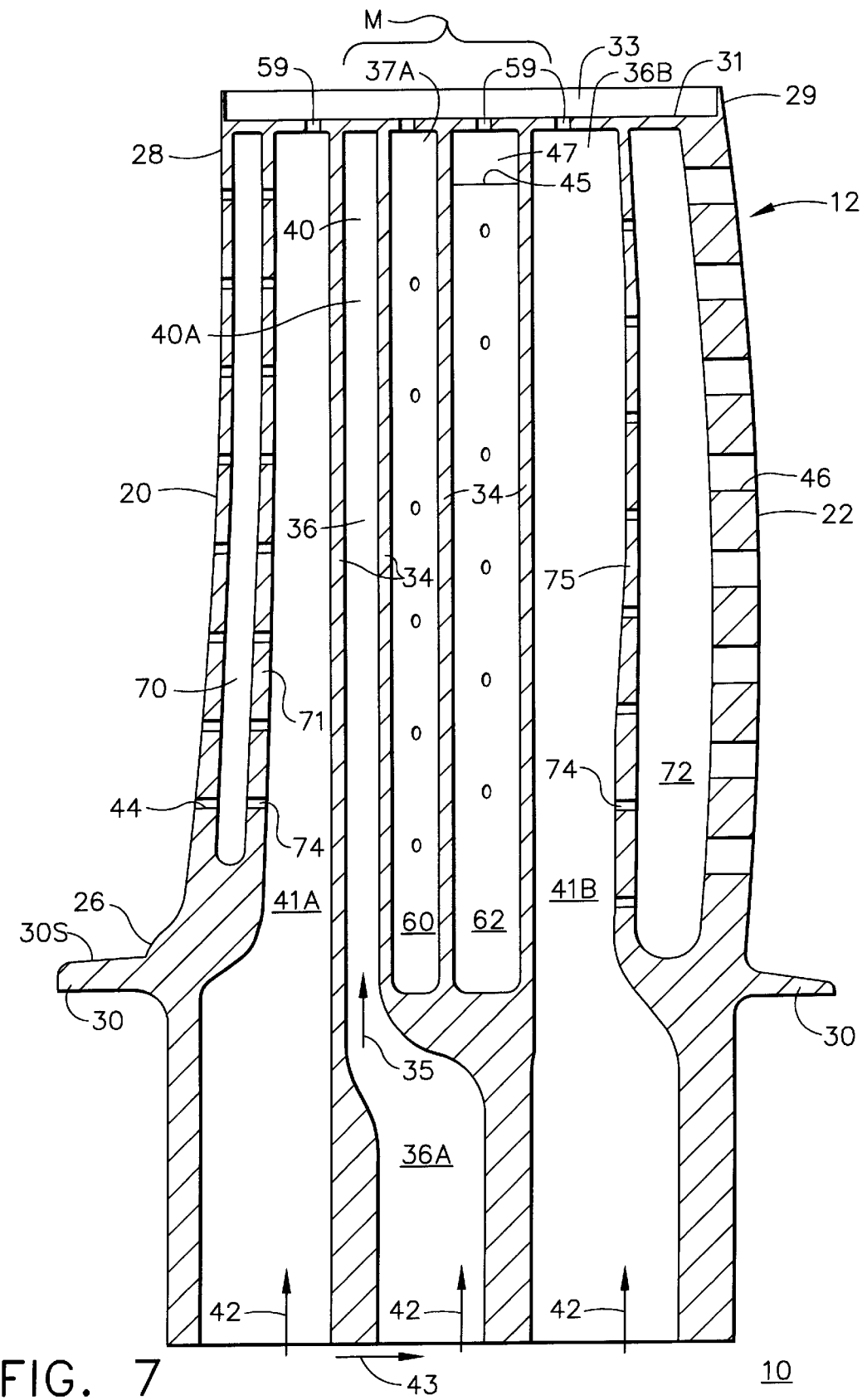
FIG. 7 is a sectional illustration through line 7—7 in FIG. 5 of the airfoil laid out flat along a mid-line through impingement cooling chambers fed by the downstream flowing serpentine cooling circuit.

The hollow airfoil 12 has longitudinally extending first and second side wall impingement chambers 60 and 62, positioned between the pressure side wall 16 and first and second inner walls 52 and 54 that bound the intermediate channel 40B and the outlet: channel 40C, respectively, of the serpentine cooling circuit 36. The first and second inner walls 52 and 54, respectively, generally extend between adjacent ones of the transverse ribs 34. Cooling air 42 is introduced into the first and second side wall impingement chambers 60 and 62, respectively, from the serpentine cooling flow 35 in the serpentine cooling circuit 36 by impingement cooling apertures 50. The impingement cooling apertures 50 independently meter a suitable amount of the cooling air 42 for accommodating the higher heat input loads along the more forward first side wall impingement chamber 60 and the relatively lower heat input load along the more afterward second side wall impingement chamber 62 and provide enhanced impingement cooling of the pressure side wall 16 along the first and second side wall impingement chambers. FIG. 7 illustrates the airfoil 12 laid out flat along an impingement chamber split-line 49 that passes through the first and second side wall impingement chambers 60 and 62, respectively.

The first and second side wall impingement chambers 60 and 62 extend radially inward to just below a radially outer platform surface 30S of the platform 30. The first side wall impingement chamber 60 extends radially outward and terminates at the outer tip wall 31. At least one of the tip cooling holes 59 in the outer tip wall 31 extends from the first side wall impingement chamber 60 through the outer tip wall 31. The use of tip cooling holes in the outer tip wall and particularly of squealer tips of airfoils are well known. The second side wall impingement chamber 62 extends radially outward and terminates at the outer tip wall 31 and also has a tip cooling hole 59 in the outer tip wall 31. Unlike the first side wall impingement chamber 60, the second side wall impingement chamber 62 includes a transverse extension which is the transverse passage 47 that is further illustrated in FIG. 8. This transverse extension is located radially outward of the end channel 40C at the transverse sideways rib 45 and centers its respective tip cooling hole 59 in the outer tip wall 31. Some of the impingement cooling apertures 50 are positioned to direct cooling air from the end channel 40C to the transverse passage 47. The placement of the tip cooling holes 59 in the radially outer ends of the first and second side wall impingement chambers 60 and 62 permits better control and metering of cooling air to the squealer type airfoil tip 28.

The airfoil squealer tip is cooled by tip cooling hole 59 in the outer tip wall 31 at locations which lead out from the first and second side wall impingement chambers 60 and 62, respectively, and from the forward and aft feed channels 41A and 41B, respectively, to the squealer tip cavity 33. The outer tip wall 31 also caps the outer most portions of the serpentine cooling circuit its channels, the impingement chambers, and the plenums.

In the preferred embodiment of the present invention, the first and second inner walls 52 and 54, respectively, the forwardmost and aftwardmost span ribs 71 and 75, respectively, the transverse ribs 34 are cast monolithically with the outer wall 15 though the invention does not require such a construction. Another feature of the preferred embodiment of the present invention is to have all the inner walls and ribs constructed each with a constant angle with respect to the centerline 11 along their entire spanwise lengths. This feature is illustrated in FIGS. 2, 3, and 4, wherein the first and second inner walls 52 and 54 are held at constant seventh and eighth rib angles R7 and R8, respectively, with respect to the centerline 11, the forwardmost and aftwardmost span ribs 71 and 75 are held at constant rib first and sixth rib angles R1 and R6, respectively, with respect to the centerline 11, and the four transverse ribs 34 are held at constant rib second, third, fourth, and fifth rib angles R2, R3, R4, and R5 in downstream succession respectively with respect to the centerline 11. The monolithic casting of the inner walls and ribs of the airfoil 12 is designed to reduce the cost and complexity of casting the airfoil 12. These features also allow a single piece core to be made from a mold assembly. This constant rib angles feature is for straight and twisted airfoils and for airfoils curved in the axial and/or circumferential direction such that stacking line SL is curved in the axial and/or circumferential direction.

As a consequence of holding the rib angles constant and having a twisted airfoil 12, the first inner wall 52 extends between the pressure and suction side walls 16 and 18, respectively, in a portion of the airfoil 12 around the airfoil tip 28, as illustrated more particularly in FIG. 2. This also provides enough area at the outer first turning channel 37A to prevent interference with or hinderance of the cooling flow 35. Though the preferred embodiment of the hollow airfoil 12 discloses a three pass version of the serpentine cooling circuit 36 and two impingement chambers other variations may be incorporated, particularly, serpentine cooling circuits 36 having more than three passes and hence more than three of the serpentine channels 40 as well as one or more impingement chambers.

A leading edge cooling plenum 70 is formed between a forwardmost span rib 71 (also referred to as a leading edge bridge) and the leading edge 20 of the outer wall 15. A trailing edge cooling plenum 72 is formed between an aftwardmost span rib 75 and the trailing edge 22 of the outer wall 15. Cooling air discharge apertures 74 in the forwardmost span rib 71 feeds cooling air from a forward feed channel 41A to the leading edge cooling plenum 70 from where it is flowed through conventional leading edge shower head cooling holes 44. Cooling air discharge apertures 74, which are preferably designed to provide impingement cooling of the trailing edge 22, in the aftwardmost span rib 75 feeds cooling air from an aft feed channel 41B to the trailing edge cooling plenum 72 from where it is flowed through conventional trailing edge cooling apertures preferably in the form of cooling slots 46, as illustrated herein. This is used to cool the leading and trailing edges 20 and 22, respectively.

The airfoil may include film cooling holes 48 along both the pressure and suction side walls 16 and 18, respectively, of the outer wall 15. The film cooling holes 48 are disposed through the outer wall 15 along a mid-chord portion of the airfoil between the leading and trailing edges 20 and 22, respectively. The film cooling holes 48 are preferably compound angled downstream and radially outward with respect to the engine centerline 11 and leading out from the first and second side wall impingement chambers 60 and 62, respectively, through the outer wall 15. In another more specific embodiment, not specifically illustrated herein, the airfoil 12 may be constructed with film cooling holes only in the pressure side wall 16 and no film cooling holes in the suction side wall 18.

The invention provides for the cooling air to be used for impingement cooling of the particularly hot portions of the outer wall 15 that are contiguous with the impingement chambers and for film cooling. Impingement cooling is very efficient and by flowing the serpentine cooling flow 35 afterwards or in a downstream direction relatively very cool cooling air in the serpentine cooling circuit 36 may be used along the more upstream and hotter portions of the pressure side wall 16, thus, maximizing cooling efficiency of the airfoil. This in turn allows the amount of cooling air 42 used for the serpentine cooling flow 35 in the serpentine cooling circuit 36 to be reduced to only that which is needed for accommodating the heat input loads in that region. The cooling air 42 introduced into the first and second side wall impingement chambers 60 and 62, respectively, from the serpentine cooling flow 35 in the serpentine cooling circuit 36 may be independently metered for providing a suitable amount of the cooling air 42 for accommodating the higher heat input loads along the more forward first side wall impingement chamber 60 and the relatively lower heat input load along the more afterward second side wall impingement chamber 62. In this way, the airfoil 12 may be preferentially cooled in the axial or chordal directions of the airfoil using less total cooling air 42 where permitted without overcooling those regions as would occur in the prior art. The cooling air 42 is therefore used more efficiently and less cooling air is bled from the compressor for increasing the overall efficiency of operation of the gas turbine engine.

The airfoil 12 may have any other conventional features for enhancing the cooling thereof such as turbulators or pins (not shown) which are well known in the art. Thermal barrier coatings TBC, well known in the technology, may also be used to improve thermal characteristics of the airfoil 12.

Although the invention has been described with respect to the exemplary turbine blade 10 illustrated in the FIGS., it may also be used for turbine nozzle vanes which have similar airfoils which can benefit from preferential span-wise cooling thereof for better matching the radial applied temperature distribution from the combustion gases 32. The aft flowing serpentine cooling circuit 36 and the first and second side wall impingement chambers 60 and 62, respectively, may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine airfoil comprising:
   an airfoil outer wall having width wise spaced apart pressure and suction side walls joined together at chordally spaced apart leading and trailing edges of said airfoil and extending longitudinally from a root to a tip;
   at least one internal serpentine cooling circuit having a plurality of longitudinally extending internal ribs extending width wise between said pressure and suction side walls;
   said one internal serpentine cooling circuit having a plurality of longitudinally extending serpentine channels between said longitudinally extending internal ribs;
   said serpentine cooling circuit including an entrance and a terminal end wherein said terminal end is positioned aft of said entrance so as to have a chordal flow direction afterwards from said leading edge to said trailing edge within said serpentine circuit; and
   at least one longitudinally extending side wall impingement chamber in downstream fluid communication with said serpentine cooling circuit, said side wall impingement chamber positioned between one of said side walls and a first inner wall bounding said serpentine cooling circuit and between two of said internal ribs.

2. An airfoil as claimed in claim 1 further comprising a plurality of first impingement cooling apertures through said first inner wall between one of said serpentine channels and said side wall impingement chamber.

3. An airfoil as claimed in claim 2 wherein said one of said side walls is said pressure side wall.

4. An airfoil as claimed in claim 3 further comprising a first plurality of side wall film cooling holes leading from said first side wall impingement chamber through said pressure side wall.

5. An airfoil as claimed in claim 3 further comprising a longitudinally extending second side wall impingement chamber in downstream fluid communication with said serpentine cooling circuit, said second side wall impingement chamber positioned between said one of said side walls and a second inner wall bounding said serpentine cooling circuit.

6. An airfoil as claimed in claim 5 wherein said first inner wall has first impingement cooling apertures in said first inner wall between a first one of said serpentine channels and said first side wall impingement chamber and said second inner wall has second impingement cooling apertures in said second inner wall between a second one of said serpentine channels and said second side wall impingement chamber.

7. An airfoil as claimed in claim 6 further comprising a first plurality of side wall film cooling holes leading from at least one of said first and second side wall impingement chambers through said pressure side wall.

8. An airfoil as claimed in claim 1 further comprising:
   leading edge and trailing edge cooling plenums along said leading and trailing edges,
   said leading edge cooling plenum having leading edge feed apertures through a forwardmost span rib of a forward feed channel located forward of said internal serpentine cooling circuit,
   a plurality of leading edge cooling apertures extend out of said leading edge cooling plenum through said outer wall around said leading edge,
   said trailing edge cooling plenum having trailing edge feed apertures through a aftwardmost span rib of an aft feed channel located aft of said internal serpentine cooling circuit,
   a plurality of trailing edge cooling apertures extend out of said trailing edge cooling plenum through said outer wall at said trailing edge.

9. An airfoil as claimed in claim 8 wherein said leading edge cooling apertures are shower head film cooling holes and said trailing edge cooling apertures are trailing edge cooling slots.

10. An airfoil as claimed in claim 9 further comprising at least one tip cooling hole extending out from at least one of said impingement chambers through a longitudinally outer tip wall of said tip.

11. An airfoil as claimed in claim 10 further comprising a squealer tip having a squealer wall extending longitudinally outward from and peripherally around said outer tip wall forming a squealer tip cavity therein.

12. An airfoil as claimed in claim 10 further comprising a transverse extension of said one of said impingement chambers, said extension located radially outward of said terminal end of said serpentine cooling circuit, and said one tip cooling hole extending out though said tip wall from said extension.

13. An airfoil as claimed in claim 2 wherein said internal ribs and said first inner wall have corresponding rib angles with respect to a centerline and each of said rib angles is constant in a longitudinal direction from said root to said tip.

14. An airfoil as claimed in claim 13 further comprising a first plurality of side wall film cooling holes leading from said first side wall impingement chamber through said pressure side wall.

15. An airfoil as claimed in claim 3 further comprising a longitudinally extending second side wall impingement chamber in downstream fluid communication with said serpentine cooling circuit, said second side wall impingement chamber positioned between said one of said side walls and a second inner wall bounding said serpentine cooling circuit wherein said internal ribs and said inner walls have corresponding rib angles with respect to a centerline and each of said rib angles is constant in a longitudinal direction from said root to said tip.

16. An airfoil as claimed in claim 15 wherein said first inner wall has first impingement cooling apertures in said first inner wall between a first one of said serpentine channels and said first side wall impingement chamber and said second inner wall has second impingement cooling apertures in said second inner wall between a second one of said serpentine channels and said second side wall impingement chamber.

17. An airfoil as claimed in claim 16 further comprising a first plurality of side wall film cooling holes leading from at least one of said first and second side wall impingement chambers through said pressure side wall.

18. An airfoil as claimed in claim 17 further comprising:

leading edge and trailing edge cooling plenums along said leading and trailing edges, said leading edge cooling plenum having leading edge feed apertures through a forwardmost span rib of a forward feed channel located forward of said internal serpentine cooling circuit, a plurality of leading edge cooling apertures extend out of said leading edge cooling plenum through said outer wall around said leading edge, said trailing edge cooling plenum having trailing edge feed apertures through a aftwardmost span rib of an aft feed channel located aft of said internal serpentine cooling circuit, a plurality of trailing edge cooling apertures extend out of said trailing edge cooling plenum through said outer wall at said trailing edge.

19. An airfoil as claimed in claim 18 wherein said leading edge cooling apertures are shower head film cooling holes and said trailing edge cooling apertures are trailing edge cooling slots.

20. An airfoil as claimed in claim 19 further comprising:

a squealer tip having a squealer wall extending longitudinally outward from and peripherally around said outer tip wall forming a squealer tip cavity therein, a transverse extension of said one of said impingement chambers, said extension located radially outward of said terminal end of said serpentine cooling circuit, and at least one tip cooling hole extending out though said tip wall from said extension.

* * * * *